(12) United States Patent
Hardinge et al.

(10) Patent No.: US 11,716,982 B2
(45) Date of Patent: Aug. 8, 2023

(54) LINE MANAGEMENT TOOL

(71) Applicant: Fiskars Brands, Inc., Middleton, WI (US)

(72) Inventors: Hal Hardinge, Tigard, OR (US); Keith Langenwalter, Portland, OR (US); Charlie Hartzell, Portland, OR (US); Seth Jaramus, Portland, OR (US)

(73) Assignee: FISKARS BRANDS, INC., Middleton, WI (US)

( * ) Notice: Subject to any disclaimer, the term of this patent is extended or adjusted under 35 U.S.C. 154(b) by 930 days.

(21) Appl. No.: 16/481,163

(22) PCT Filed: Feb. 2, 2018

(86) PCT No.: PCT/US2018/016675
§ 371 (c)(1),
(2) Date: Jul. 26, 2019

(87) PCT Pub. No.: WO2018/144889
PCT Pub. Date: Aug. 9, 2018

(65) Prior Publication Data
US 2019/0380322 A1      Dec. 19, 2019

Related U.S. Application Data

(60) Provisional application No. 62/455,372, filed on Feb. 6, 2017.

(51) Int. Cl.
*A01K 91/04*      (2006.01)
*B25B 7/02*       (2006.01)
(Continued)

(52) U.S. Cl.
CPC .............. *A01K 91/04* (2013.01); *B25B 7/02* (2013.01); *B25B 7/08* (2013.01); *B25B 7/14* (2013.01)

(58) Field of Classification Search
CPC ........ A01K 91/04; A01K 95/02; A01K 97/00; A01K 97/02; A01K 91/03; B25B 7/02;
(Continued)

(56) References Cited

U.S. PATENT DOCUMENTS

| | | | | |
|---|---|---|---|---|
| 651,082 A | * | 6/1900 | McClary ................... | B25B 7/02 |
| | | | | 30/349 |
| 723,627 A | * | 3/1903 | Underwood ........... | A01K 91/04 |
| | | | | 112/156 |

(Continued)

FOREIGN PATENT DOCUMENTS

| | | | |
|---|---|---|---|
| CN | 101120888 | 2/2008 | |
| GB | 2388568 A | * 11/2003 | ............... B25B 5/04 |

OTHER PUBLICATIONS

Gerber Gear, "New Linedriver: Fishing Line Management Multi-Tool", Accessed at: https://www.gerbergear.com/Activity/FISH/Linedriver_31-003287, 5 pages.

(Continued)

*Primary Examiner* — Timothy D Collins
*Assistant Examiner* — Maria E Graber
(74) *Attorney, Agent, or Firm* — Foley & Lardner LLP

(57) ABSTRACT

A fishing tool includes a main body and a holding assembly coupled to the main body. The holding assembly includes a bottom holding jaw and a top holding jaw rotatably coupled to the bottom holding jaw and movable relative to the bottom holding jaw between an open holding position and a closed holding position to selectively hold a fish hook in place. The holding assembly is rotatable relative to the main body and configured to be secured relative to the main body in a fixed number of positions.

17 Claims, 13 Drawing Sheets

(51) Int. Cl.
*B25B 7/08* (2006.01)
*B25B 7/14* (2006.01)

(58) Field of Classification Search
CPC .... B25B 7/08; B25B 7/14; B25B 3/00; B25B 5/00; B25B 5/04; B25B 5/06; B25B 7/07
USPC ............... 43/43.16; 269/3, 6, 95; 7/108, 125
See application file for complete search history.

(56) References Cited

U.S. PATENT DOCUMENTS

| | | | | |
|---|---|---|---|---|
| 800,849 | A * | 10/1905 | Holly | A01K 91/04 140/123 |
| 953,170 | A * | 3/1910 | Kraeuter | B25B 7/02 81/416 |
| 1,410,184 | A * | 3/1922 | Fletcher | B25B 5/006 269/80 |
| 2,493,142 | A * | 1/1950 | Hutton | A01K 97/18 43/53.5 |
| 2,530,713 | A * | 11/1950 | Martinez | A01K 97/28 269/163 |
| 2,790,341 | A * | 4/1957 | Keep | A01K 95/02 43/44.89 |
| 3,172,319 | A * | 3/1965 | Stephen | A01K 95/02 7/106 |
| 3,839,930 | A * | 10/1974 | Taylor | B25B 7/02 81/328 |
| 3,862,516 | A * | 1/1975 | Broscoff | B25B 3/00 D8/74 |
| 4,134,577 | A * | 1/1979 | Price | B25B 5/10 269/71 |
| 4,216,948 | A * | 8/1980 | Carter | A01K 97/28 269/238 |
| 4,899,482 | A | 2/1990 | Gerdes | |
| 5,092,074 | A * | 3/1992 | Zincke | A01K 97/00 43/53.5 |
| 5,169,079 | A * | 12/1992 | Renzetti | A01K 97/28 242/448 |
| 5,373,866 | A * | 12/1994 | Whalen, II | F16L 41/06 222/5 |
| 5,383,695 | A | 1/1995 | Couper | |
| 5,791,699 | A * | 8/1998 | High | D03J 3/00 289/17 |
| 5,839,141 | A * | 11/1998 | Hermann | B21F 15/04 7/106 |
| 5,850,649 | A * | 12/1998 | Simpson | A01K 97/00 7/106 |
| 6,119,972 | A | 9/2000 | Vogel et al. | |
| 6,684,465 | B1 * | 2/2004 | Jo | B25B 5/06 24/506 |
| 6,721,983 | B2 * | 4/2004 | Dallas | B25F 1/04 7/128 |
| 7,076,910 | B1 * | 7/2006 | Xifra | A01K 97/14 177/148 |
| 2007/0256349 | A1* | 11/2007 | Fyvolent | A01K 91/04 43/53.5 |
| 2010/0122420 | A1 | 5/2010 | Nason et al. | |
| 2012/0005939 | A1 | 1/2012 | Vandewalle | |
| 2014/0167413 | A1 | 6/2014 | Ross | |
| 2015/0239100 | A1* | 8/2015 | Wu | B25B 7/14 81/324 |
| 2015/0239101 | A1* | 8/2015 | Wu | B25B 7/14 81/324 |
| 2016/0270383 | A1 | 9/2016 | O'Neal | |
| 2016/0299015 | A1* | 10/2016 | Schmier, II | B25B 5/06 |
| 2016/0368125 | A1* | 12/2016 | Kim | B25B 7/08 |
| 2017/0006846 | A1* | 1/2017 | Nitta | A01K 91/18 |
| 2017/0112115 | A1* | 4/2017 | Graham | A01K 95/02 |
| 2017/0203412 | A1* | 7/2017 | Grobbel | B25B 5/06 |
| 2018/0192626 | A1* | 7/2018 | Jaramus | B25F 1/04 |

OTHER PUBLICATIONS

International Search Report and Written Opinion for International Application No. PCT/US2018/016675, dated Jun. 8, 2018, 11 pages.
Office Action and English Translation of Office Action Received for Chinese Application No. 201880007415.8, dated Dec. 31, 2020, 19 pages.

* cited by examiner

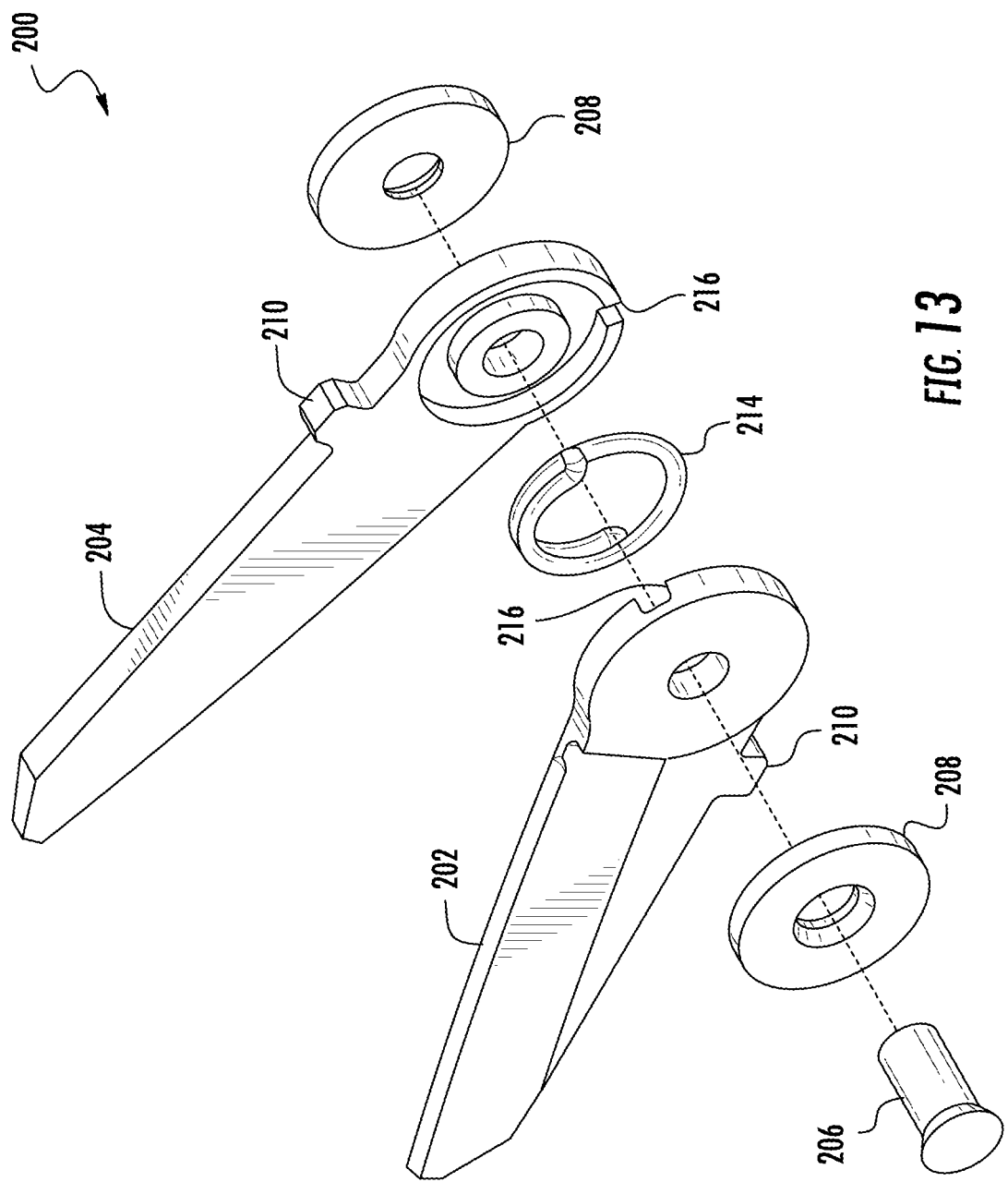

LINE MANAGEMENT TOOL

CROSS-REFERENCE TO RELATED PATENT APPLICATIONS

This application is a U.S. national stage application of International Patent Application No. PCT/US2018/016675, filed Feb. 2, 2018, which claims the benefit of and priority to U.S. Provisional Patent Application No. 62/455,372, filed Feb. 6, 2017, the entire contents of both applications are incorporated herein by reference.

BACKGROUND

The present invention relates generally to the field of hand tools and in particular to the field of hand tools suitable for use when fishing.

SUMMARY

One embodiment of the invention relates to a fishing tool including a main body and a holding assembly coupled to the main body. The holding assembly includes a bottom holding jaw and a top holding jaw rotatably coupled to the bottom holding jaw and movable relative to the bottom holding jaw between an open holding position and a closed holding position to selectively hold a fish hook in place. The holding assembly is rotatable relative to the main body and configured to be secured relative to the main body in a fixed number of positions.

Another embodiment relates to a fishing tool including a main body and a cutting assembly coupled to the main body. The cutting assembly includes a top blade jaw, a bottom blade jaw rotatable relative to the top blade jaw and a scissor assembly including a top blade and a bottom blade rotatable relative to the top blade. The top blade and the bottom blade are removably coupled to the top blade jaw and the bottom blade jaw. In some embodiments, the fishing tool may also include a lock coupled to the bottom blade jaw, wherein the scissor assembly is selectively movable between an open scissor position and a closed scissor position, with a partially closed scissor position located between the open scissor position and the closed scissor position, wherein the lock is selectively movable between a locked position and an unlocked position, and wherein in the locked position, the lock prevents the scissor assembly from moving from the partially closed scissor position to the open scissor position. In some embodiments, the fishing tool may also include a biasing member configured to apply a biasing force to bias the scissor assembly toward the open scissor position. In some embodiments, the fishing tool may also include a fastener configured to contain the scissor assembly between the top blade jaw and the bottom blade jaw, wherein the scissor assembly is removable from the top blade jaw and the bottom blade jaw upon removal of the fastener.

Another embodiment relates to a fishing tool including a main body and a clamping assembly coupled to the main body. The clamping assembly includes a bottom jaw including a bottom opening formed through the jaw and a bottom slot extending away from the bottom opening and a top jaw including a top opening formed through the top jaw and a top slot extending away from the top opening. The top jaw is rotatably coupled to the bottom jaw and movable relative to the bottom jaw between an open clamping position and a closed clamping position configured to hold a fish hook in place between the top jaw and the bottom jaw. In the closed clamping position, the top opening is aligned with the bottom opening to allow a fishing line to be threaded through an eyelet of the fish hook held between the top clamping surface and the bottom clamping surface. The top slot is aligned with the bottom slot so that the fishing line threaded through the eyelet of the fish hook is removable through the top slot and the bottom slot. In some embodiments, the fishing tool may be constructed so that the top jaw includes a centering protrusion and the bottom jaw defines a centering recess that receives the centering protrusion when the top jaw is in the closed clamping position. In some embodiments, the fishing tool may be constructed so that the top jaw includes a top exterior surface, the bottom jaw includes a bottom exterior surface, the top opening is wider near the top exterior surface and narrower near the top clamping surface, and the bottom opening is wider near the bottom exterior surface and narrower near the bottom clamping surface. In some embodiments, the fishing tool may include a biasing member configured to apply a biasing force to bias the top jaw toward the open clamping position.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which:

FIG. 13 is an exploded view of the scissor assembly of the cutting assembly of FIG. 8.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

A line management tool is configured to assist a user with various tasks when preparing a fishing line for use and other tasks related to fishing (e.g., attaching hooks or lures, cutting fishing line, attaching weights, clearing eyelets on fish hooks, etc.). According to various exemplary embodiments, the line management tool includes a cutting assembly and a holding assembly, each attached to a main body. The holding assembly includes a set of holding jaws with a protrusion and can rotate relative to the main body. A hook can be clamped in the holding jaws and spun while tying certain knots that require twisting of fishing line. A set of detents prevent the holding assembly from unintentionally rotating relative to the main body and unwinding the fishing line. The cutting assembly includes a scissor assembly within a set of cutting jaws. The scissor assembly can be used to cut fishing line and can be easily removed to facilitate sharpening or replacement. The cutting jaws extend beyond the scissor assembly. A set of slits cut in the cutting jaws allows the user to align the eyelet of a hook with the slits to thread fishing line through the eye, after which the slits allow the hook and fishing line to be easily removed.

Figure 1:
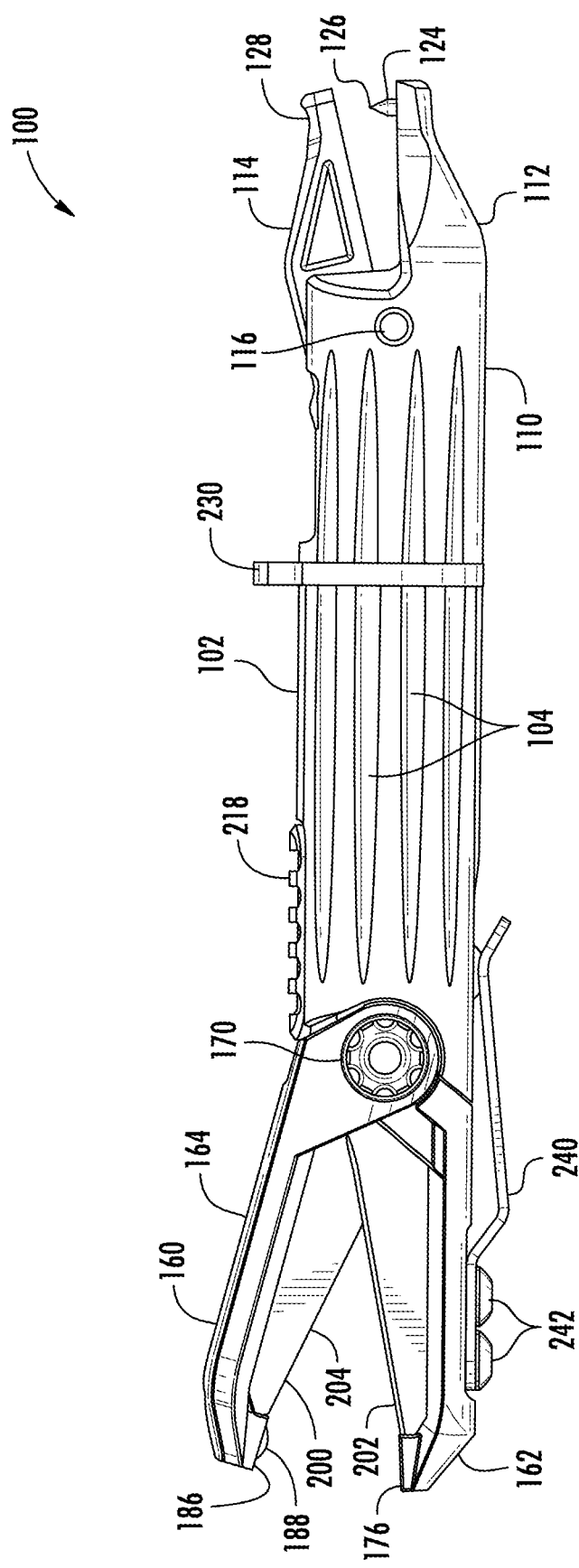
FIG. 1 is a side view of a line management tool, according to an exemplary embodiment.
Figure 2:
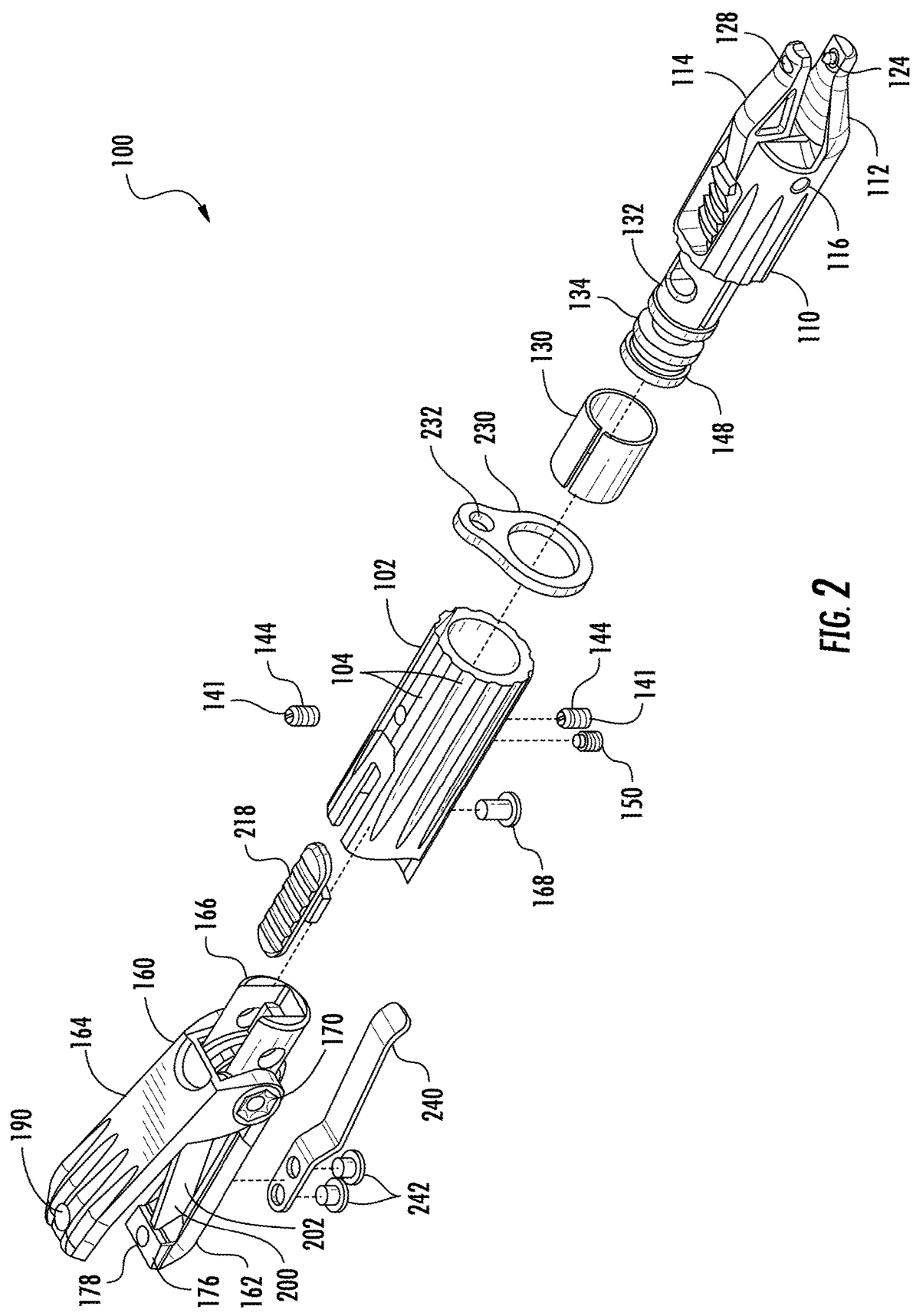
FIG. 2 is an exploded view of the line management tool of FIG. 1.

Referring to FIGS. 1 and 2, a fishing tool, referred to as line management tool 100, is illustrated according to an exemplary embodiment. The line management tool 100 includes a main body 102. As shown in FIG. 1, the main body 102 is cylindrical. In other embodiments, the main body 102 may have a different cross sectional shape. In some embodiments, the main body 102 defines a number or radially arranged grooves 104 that run parallel to a longitudinal axis of the main body 102. The grooves 104 facilitate gripping the tool 100 even when it is wet (e.g., from being splashed with water). In other embodiments, the surface finish and material of the main body 102 are varied to optimize the user's gripping ability of the main body 102 (e.g., the surface is knurled or covered in soft rubber, etc.). In some embodiments, the surface of the main body 102 is smooth.

Referring again to FIGS. 1 and 2, a holding assembly 110 is coupled to the main body 102. In the embodiment shown in FIG. 1, the holding assembly 110 is oriented concentrically with the main body 102, however in other embodiments the orientation of the holding assembly 110 to the main body 102 varies. The holding assembly 110 includes a bottom holding jaw or bottom jaw 112 and a top holding jaw or top jaw 114. In some embodiments, the bottom jaw 112 is coupled to the main body 102, and the top jaw 114 is coupled to the bottom jaw 112. In other embodiments, the bottom jaw 112 and the top jaw 114 are both coupled an intermediate body, which is in turn coupled to the main body 102. Referring again to the embodiment shown in FIG. 1, the top jaw 114 is rotatably coupled to the bottom jaw 112 and rotates about holding axle 116. The top jaw 114 has a closed holding position and an open holding position relative to the bottom jaw 112. In the closed holding position, the end of the top jaw 114 distal to the main body 102 is near (e.g., touching or close to touching) the bottom jaw 112. In the open holding position, the top jaw 114 is rotated such that the end of the top jaw 114 distal to the main body 102 is farther away from the bottom jaw 112. In some embodiments, some features of or connections to the top jaw 114 described herein are instead features of or connections to the bottom jaw 112. In some embodiments, some features of or connections to the bottom jaw 112 described herein are instead features of or connections to the top jaw 114.

Figure 3:
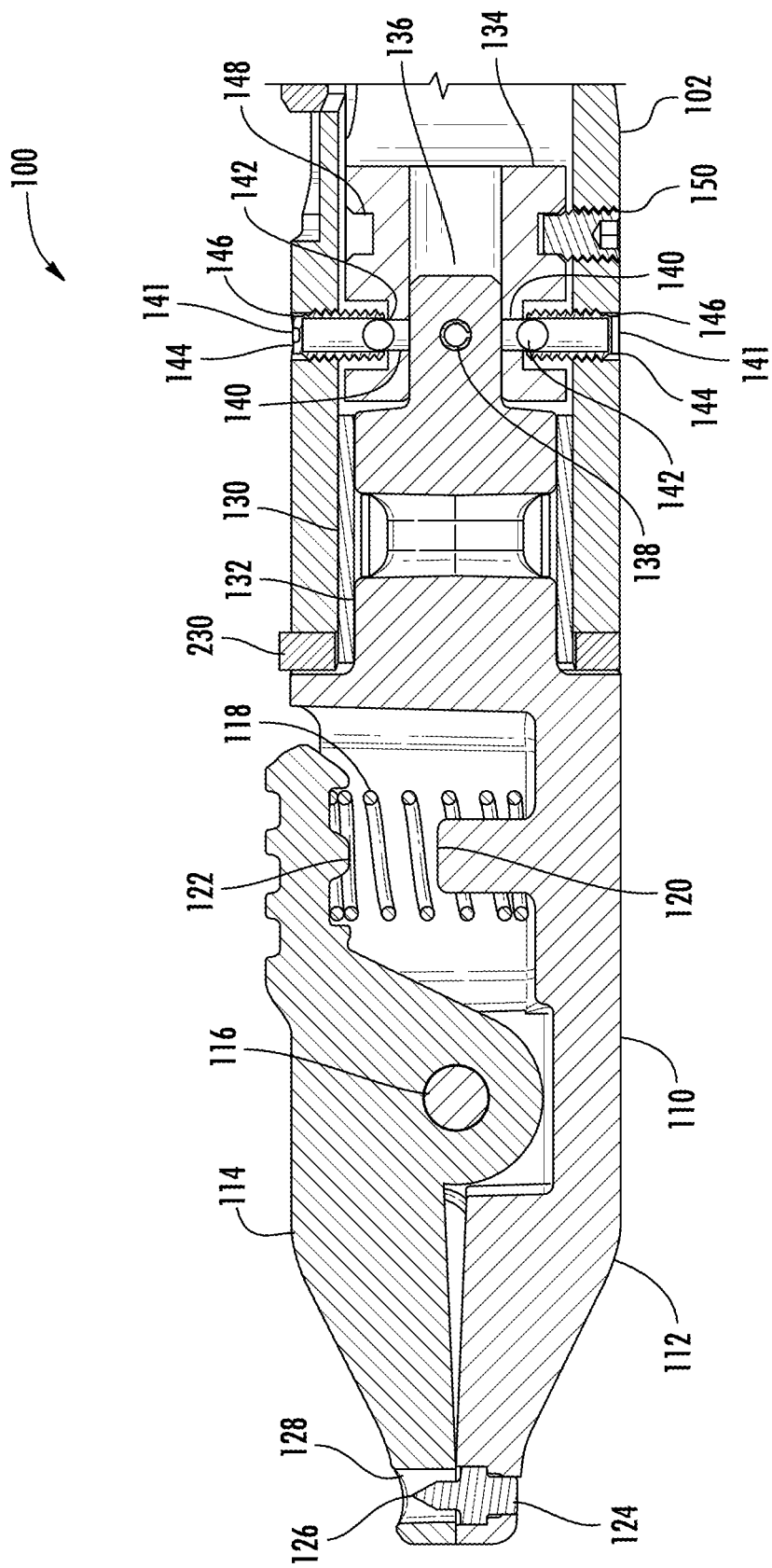
FIG. 3 is a section view of a portion of the line management tool of FIG. 1.
Figure 4:
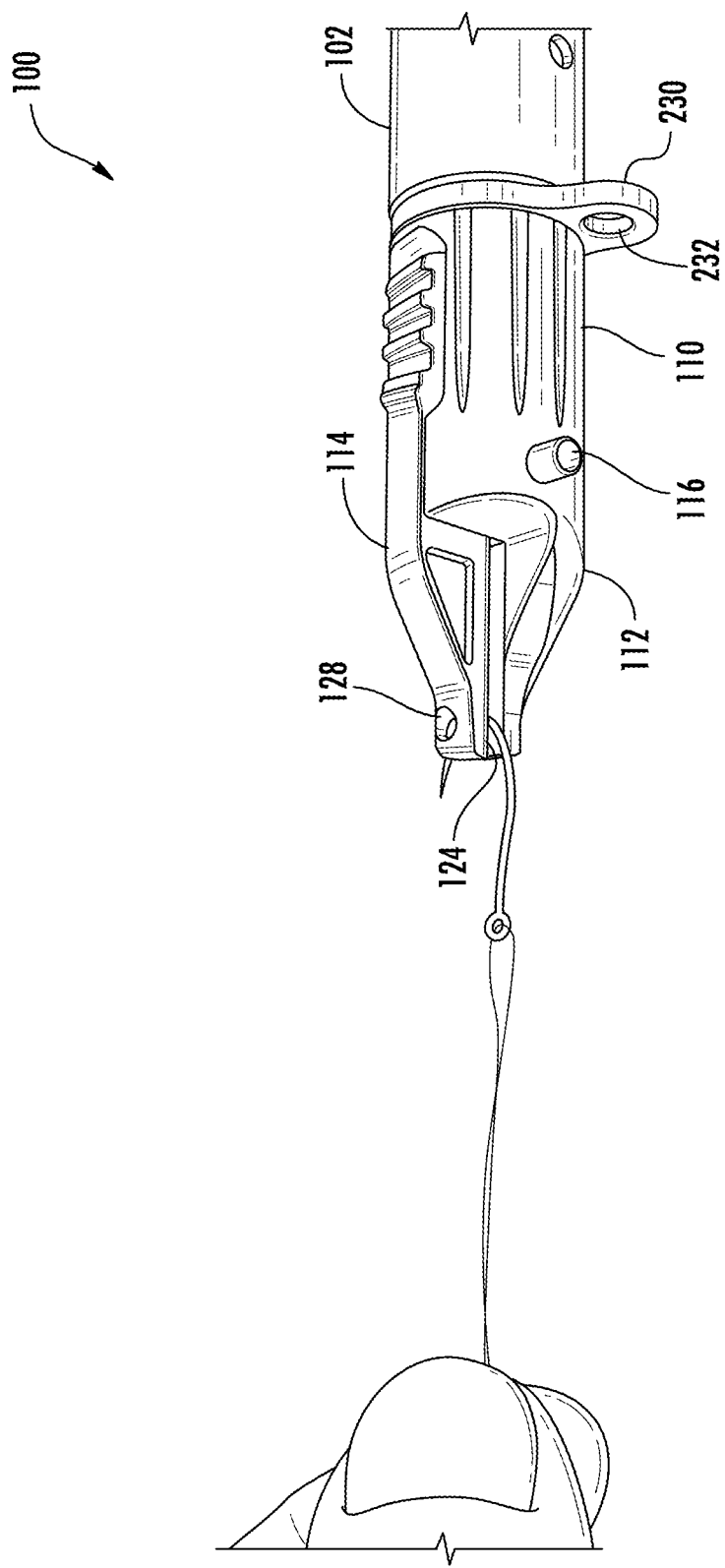
FIG. 4 is a perspective view of the line management tool of FIG. 1.

Referring to FIG. 3, a biasing member, shown as compression spring 118, is configured to apply a biasing force to bias the top jaw 114 toward the closed holding position. In some embodiments, the spring 118 is located by a bottom spring protrusion 120 and a top spring protrusion 122, extending from the bottom jaw 112 and the top jaw 114 respectively, that extend inside the coils of the spring 118. In some embodiments, the top jaw 114 and/or bottom jaw 112 include extensions or recesses that locate the spring 118 by holding the outside surface of the spring 118. When a user applies a compressive force on the top jaw 114 near the spring 118, the spring 118 is compressed, and the top jaw 114 rotates toward the open holding position. When no external force is applied to the top jaw 114, the force of the spring 118 on the top jaw 114 biases the top jaw 114 toward the closed holding position. This applies a clamping force on an object (e.g., a fishing hook) placed between the top jaw 114 and the bottom jaw 112. By way of example, this allows a hook to be clamped between the top jaw 114 and the bottom jaw 112 to hold a fishing hook in a desired position relative to the main body 102 while tying a knot, as shown in FIG. 4.

Figure 5:
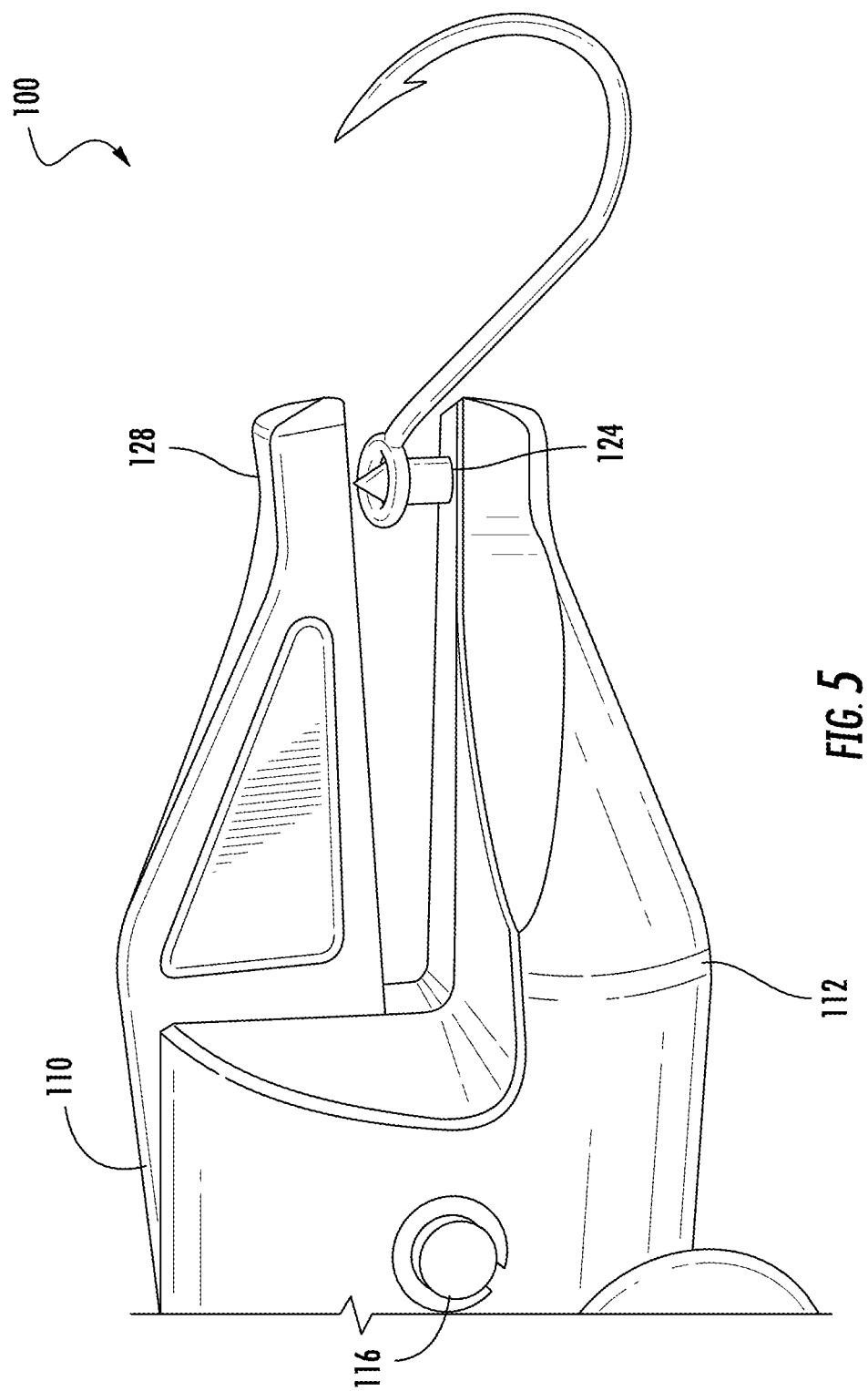
FIG. 5 is a perspective view of the holding assembly of the line management tool of FIG. 1.

Located near the distal end of the bottom jaw 112 is a protrusion or clearing pin 124. In some embodiments, the protrusion 124 is a separate component that is attached to the bottom jaw 112 (e.g., through adhesive, through a press fit, threaded attachment, etc.). In other embodiments, the protrusion 124 is formed as part of the bottom jaw 112. The protrusion 124 prevents hooks from being removed from the holding assembly 110 when tying a knot, as shown in FIG. 4. In some embodiments, the distal end 126 of the protrusion 124 is pointed (i.e., the protrusion width is greater near the base end where the protrusion 124 meets the bottom jaw 112 than at the distal end 126). In some cases, debris needs to be removed from the eyelet of a fishing hook before fishing line can be threaded through the eyelet (e.g., when hardened paint covers the eyelet of a jig head). The pointed distal end 126 can be forced through the eyelet of a hook to clear out any debris, as demonstrated in FIG. 5. In some embodiments, the protrusion 124 is made from a relatively hard material (e.g., steel) to ensure it will not deform and dull the distal end 126 when clamping onto metal hooks or other objects. In other embodiments, the distal end 126 is blunt. In some embodiments, the top jaw 114 defines an aperture or recess 128 configured to receive the protrusion 124 when the top jaw 114 is in the closed holding position in order to allow the top jaw 114 to reach the closed holding position. In some embodiments, the protrusion 124 extends from the top jaw 114. In some embodiments, the bottom jaw 112 defines the aperture 128. In some embodiments, there are multiple protrusions 124 and/or apertures 128.

Referring again to FIG. 3, the bottom jaw 112 extends inside the main body 102. A bearing 130 is disposed between a bearing portion 132 of the bottom jaw 112 and the inside of the main body 102. The bearing 130 supports the bottom jaw 112 while allowing the bottom jaw 112 (and, by extension, the holding assembly 110) to rotate freely relative to the main body 102. The bearing 130 may be made from a variety of conventional bearing configurations (e.g., a needle bearing, a bronze bushing, etc.). In some embodiments, the middle section of the bearing portion 132 includes a cutout or is a smaller diameter than the rest of the bearing portion 132 to save material or to allow for variations in diameter of the bottom jaw 112 and the main body 102.

The holding assembly 110 includes a detent tube 134 that is coupled to a detent portion 136 the bottom jaw 112 (e.g., with a roll pin 138). The detent tube 134 defines a number of detents 140 (e.g., apertures or depressions) arranged radially around the circumference of the detent tube 134 and oriented facing outward. The detents 140 receive a locking member, referred to as plunger assembly 141. The plunger assembly 141 includes ball bearing 142 contained within a cylindrical tube 144 and biased to extend toward the detents 140 by a biasing force (e.g., provided by a biasing member such as a compression spring). The cylindrical tubes are held in apertures 146 (e.g., by a threaded connection, by adhesive, etc.) defined in the main body 102. When a detent 140 aligns with a ball bearing 142, the ball bearing 142 is biased into the detent 140, preventing the holding assembly 110 from rotating relative to the main body 102. If a torsional force is applied to the holding assembly 110, the ball bearing 142 is forced against the edge of the detent 140. If a threshold torsional force is applied, the biasing force on the ball bearing 142 is overcome and the ball bearing 142 is forced into the cylindrical tube 144, allowing the holding assembly 110 to rotate.

The number and relative position of ball bearings 142 and detents 140 determines a fixed number of positions in which the holding assembly 110 can be secured relative to the main body 102 (i.e., positions where one of the ball bearings 142 aligns with and extends into a detent 140). Arranging the tool such that the quantity of detents 140 is greater than the quantity of ball bearings 142 provides multiple positions in which the holding assembly 110 can be secured while minimizing the amount of components in the tool 100. By way of another example, if there are two ball bearings 142, each 180 degrees from each other, and three detents 140, each 120 degrees from each other, then the holding assembly 110 will have six fixed positions with one ball bearing 142 received by a detent 140 in each position. In some embodiments, the detents 140 and ball bearings 142 are arranged such that in every secured position of the holding assembly 110, multiple ball bearings 142 are each received by a detent 140. Having multiple ball bearings 142 engaged at one time increases the threshold torque necessary to turn the holding assembly 110 relative to the main body 102. By way of example, if there are two ball bearings 142, each 180 degrees from each other, and four detents 140, each 90 degrees away from each other, then the holding assembly 110 will have four fixed positions with two ball bearings 142 each received by a detent 140 in each position.

The detent tube 134 additionally defines an annular groove, referred to as groove 148. A protrusion 150 extends from the main body 102 into the groove 148. In some embodiments, the protrusion 150 is threaded and corresponds with a mating thread on the main body 102 for ease of assembly. The interference between the groove 148 and the protrusion 150 prevents translation of the holding assembly 110 relative to the main body 102. In some embodiments, the exterior corners of the groove 148 are filleted or chamfered to facilitate entry of the protrusion 150 into the groove, even if they are initially misaligned. In some embodiments, the detent tube 134 is made from a relatively hard material (e.g., steel) to prevent wear.

Referring again to FIG. 4, the holding assembly 110 is shown being used to tie a knot to secure fishing line to a hook. Some types of knots commonly used in fishing applications (e.g., the improved clinch knot) require fishing line to be twisted a number of times (e.g., 5), which can be difficult to accomplish by hand. When tying one of these knots with the tool 100, the fishing line is initially threaded through the eyelet of the fishing hook (e.g., with the cutting assembly 160 as described herein), and the hook is clamped in the holding assembly 110. The line can be held, as shown in FIG. 4, and the holding assembly 110 can be turned. The interference of the ball bearings 142 with the detents 140 prevents the fishing line from unraveling, but the user can turn the holding assembly 110 by applying the threshold torque. While the tool 100 holds the hook in place, the user is free to use one hand to hold the line and the other hand to manipulate the loose end of the fishing line. Conventionally, the user would have to attempt to perform all three of these tasks simultaneously by hand.

Figure 6:
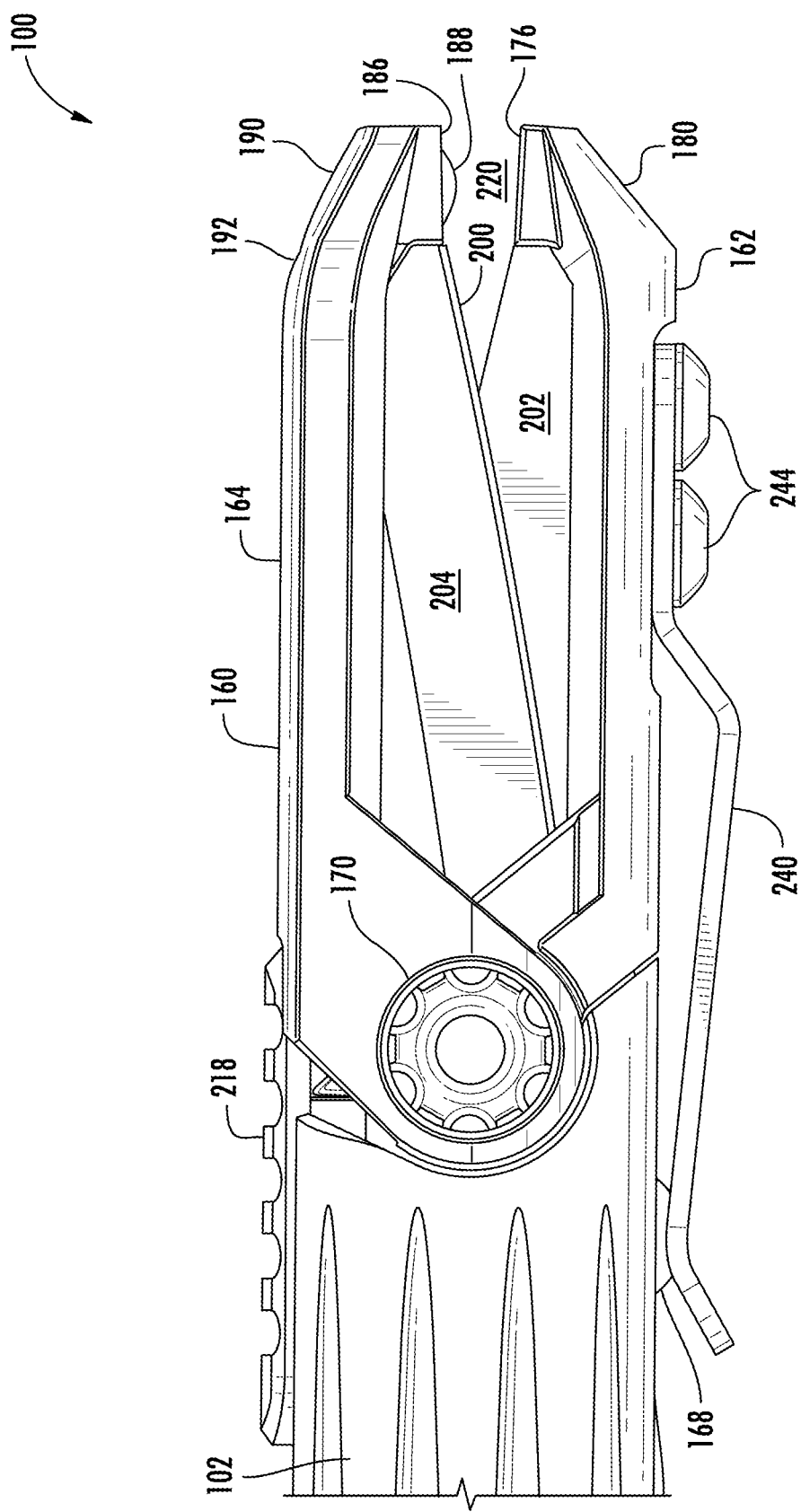
FIG. 6 is a side view of a portion of the line management tool of FIG. 1.
Figure 7:
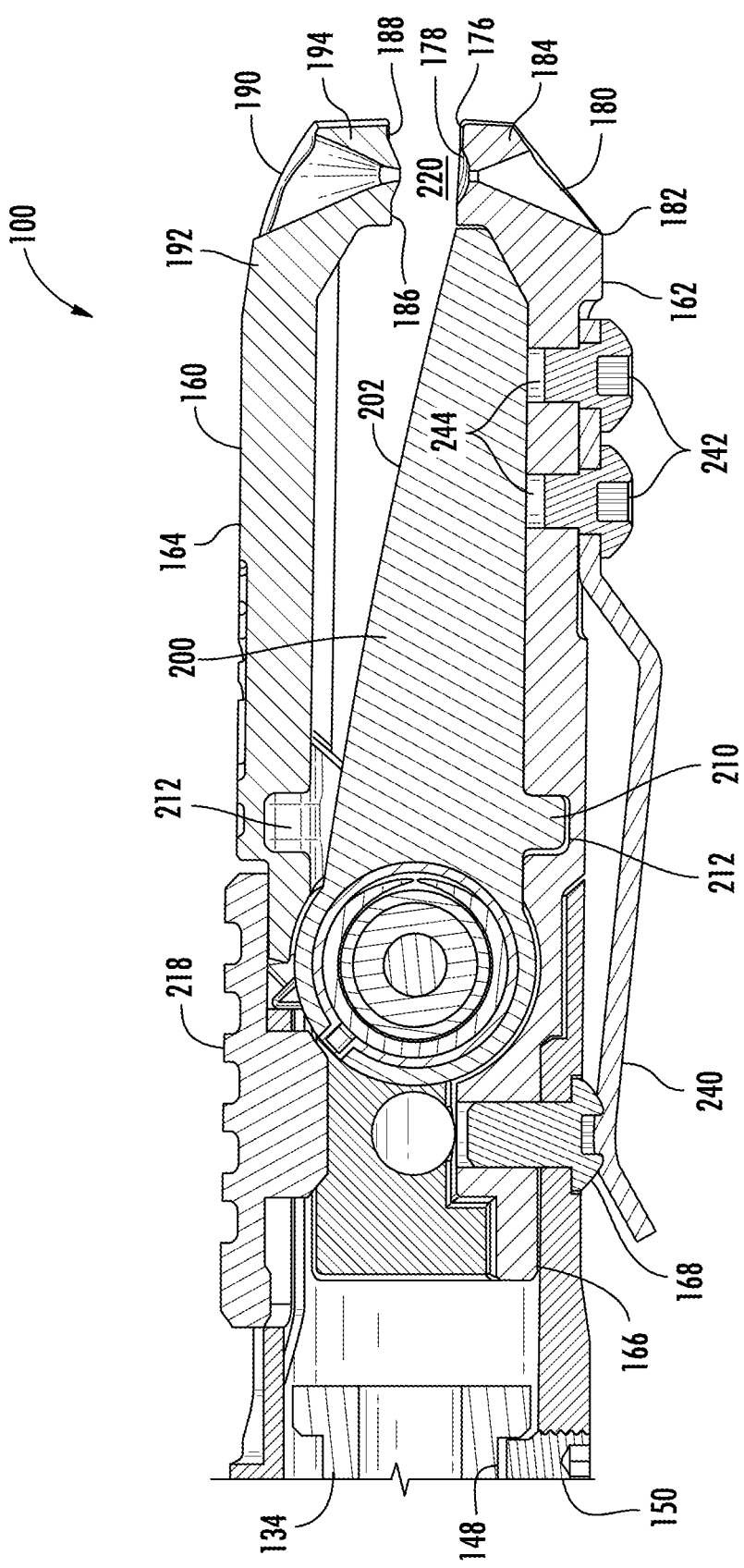
FIG. 7 is a section view of a portion of the line management tool of FIG. 1.
Figure 8:
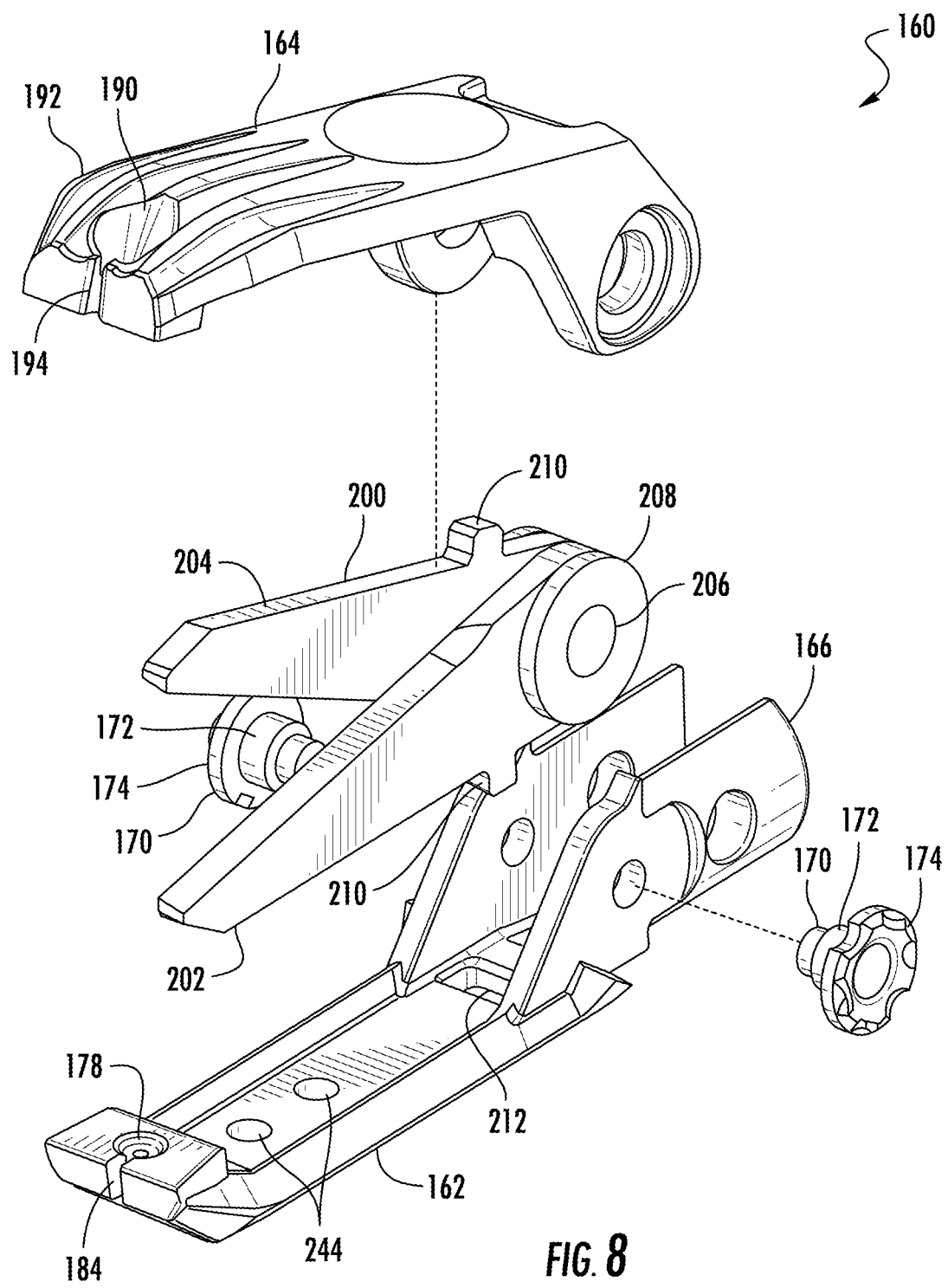
FIG. 8 is an exploded view of the cutting assembly of the line management tool of FIG. 1.

Referring to FIGS. 6-8, a cutting assembly or clamping assembly 160 of the tool 100 is shown. The assembly 160 includes a bottom blade jaw or bottom jaw 162, shown in FIG. 9, and a top blade jaw or top jaw 164, shown in FIG. 10. A portion 166 of the bottom jaw 162 extends inside of and is coupled to the main body 102. A fastener 168 extends through an aperture in the main body 102 and threads into the portion 166, preventing the assembly 160 from rotating or translating relative to the main body 102. In other embodiments, a portion of the top jaw 164 extends into the main body 102. In yet other embodiments, both the bottom jaw 162 and the top jaw 164 are coupled to an intermediate member that is coupled to the main body 102. In some embodiments, some features of or connections to the top jaw 164 described herein are instead features of or connections to the bottom jaw 162. In some embodiments, some features of or connections to the bottom jaw 162 described herein are instead features of or connections to the top jaw 164.

The bottom jaw 162 and the top jaw 164 are coupled to one another using fasteners 170. In some embodiments, the fasteners 170 are threaded into the bottom jaw 162 and the top jaw 164 rotates about a smooth shoulder 172 of the fastener 170. In some embodiments, the fasteners 170 are threaded into the top jaw 164, and the bottom jaw 162 rotates about the smooth shoulder 172 of the fastener 170. In some embodiments, one fastener 170 thread into the top jaw 164 while another fastener 170 threads into the bottom jaw 162. In some embodiments, a head 174 of the fastener 170 has a rough surface (e.g., from knurling or from cutting grooves into the head 174, etc.) that allows the user to turn the fastener 170 by hand. In some embodiments, the head 174 includes a standard interface (e.g., a slot head, a Philips head, a torx head) to allow the user to turn the fastener 170 with a standard tool (e.g., a screw driver, an Allen key). In other embodiments, the head 174 includes an interface that requires a specialized tool.

The bottom jaw 162 and the top jaw 164 are movable relative to one another between an open clamping position, a closed clamping position, and a partially closed clamping position that is located between the open and closed clamping positions. In the open clamping position, shown in FIG. 1, the top jaw 164 is rotated away from the bottom jaw 162. In the closed clamping position, the top jaw 164 is rotated toward the bottom jaw 162 (i.e., the end of the top jaw 164 distal to the main body 102 is rotated away from the bottom jaw 162). In some embodiments, the assembly 160 includes a biasing member (e.g., a spring) to apply a biasing force to bias the top jaw 164 to the open clamping position.

Figure 9:
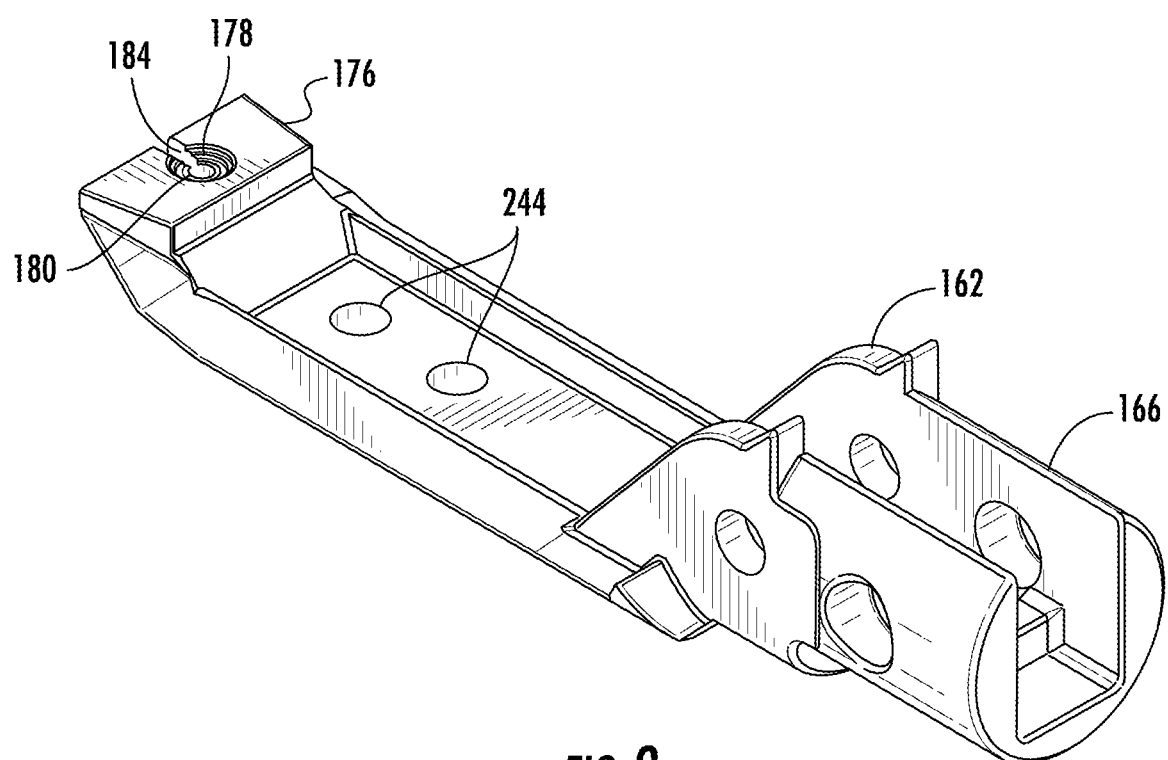
FIG. 9 is a perspective view of the bottom jaw of the cutting assembly of FIG. 8.

Referring to FIG. 9, the bottom jaw 162 includes a bottom clamping surface 176. The bottom clamping surface 176 is shown as flat, but in other embodiments, the surface 176 has a different shape and/or surface finish (e.g., a number of small grooves, a large notch, a point, etc.). Defined on the surface 176 is a centering recess 178. The centering recess 178 is tapered such that the width or diameter of the recess 178 decreases as the recess 178 enters the bottom jaw 162. In some embodiments, the recess 178 tapers gradually (e.g., makes a conical shape, a frustoconical shape, or has parabolic cross section). In other embodiments, as shown in FIG. 9, the surface of the recess 178 has a number of concentric steps of varying diameter. The diameter of these steps may correspond to the outside diameter of commonly used fishing hook eyelets. A bottom opening 180 is defined through the bottom jaw 162. In some embodiments, the bottom opening 180 is concentric with the recess 178. In other embodiments, the bottom opening 180 passes through a different portion of the bottom jaw 162. As shown in FIG. 7, the bottom opening 180 is tapered such that the opening is wider near a bottom exterior surface 182 of the bottom jaw 162 and narrower near the bottom clamping surface 176. A bottom slot 184 defined in the bottom jaw 162 extends away from the bottom opening 180. In some embodiments, the bottom slot 184 extends forward (i.e., along the longitudinal centerline of the bottom jaw 162). In other embodiments, the bottom slot 184 may extend in another direction away from the bottom opening 180.

Figure 10:
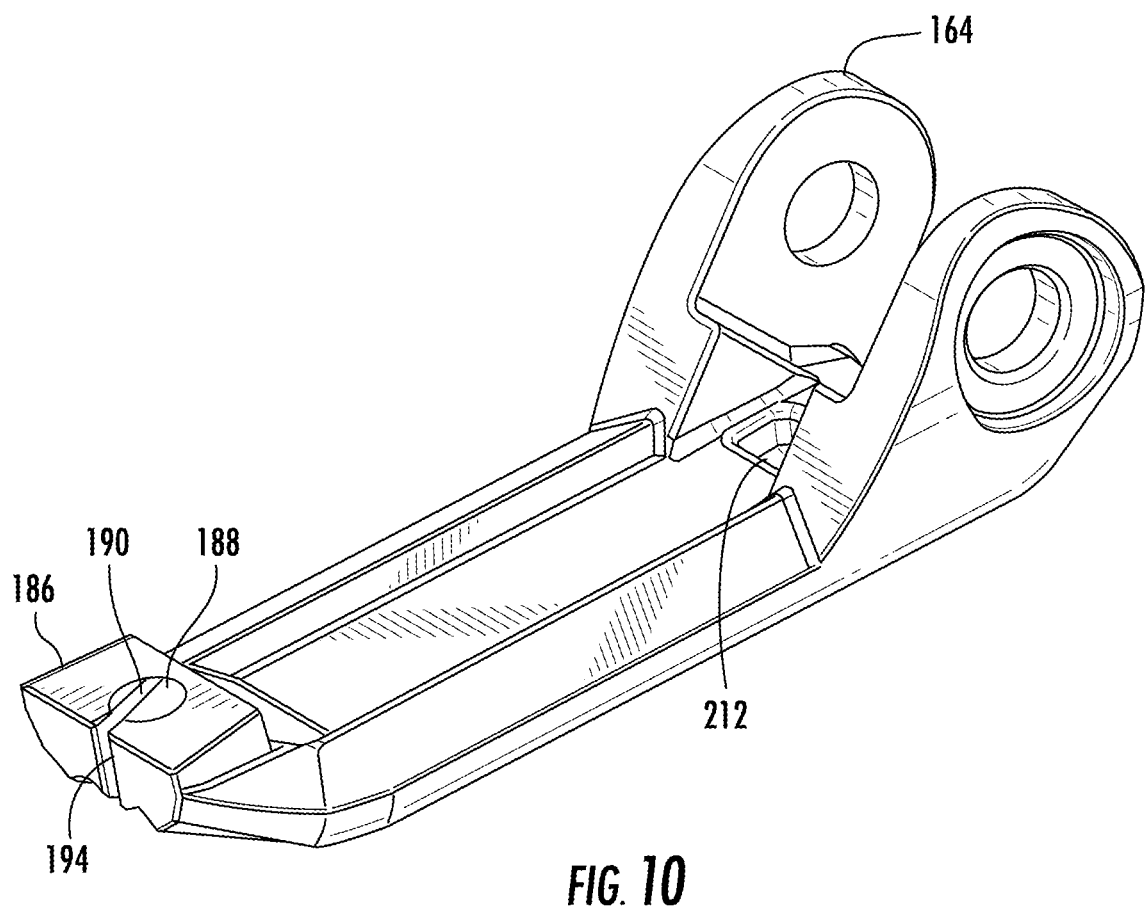
FIG. 10 is a perspective view of the top jaw of the cutting assembly of FIG. 8.

Referring to FIG. 10, the top jaw 164 includes a top clamping surface 186. The top clamping surface 186 is shown as flat, but in other embodiments, the surface 186 is has a different shape and/or surface finish (e.g., a number of small grooves, a large notch, a point, etc.). Defined on the surface 186 is a centering protrusion 188. The centering protrusion 188 is tapered such that the width or diameter of the protrusion 188 decreases as the protrusion 188 extends away from the top jaw 164. In some embodiments, the protrusion 188 tapers gradually (e.g., makes a conical shape, a frustoconical shape, or has parabolic cross section). The protrusion 188 is received by the centering recess 178 when the top jaw 164 is in the closed clamping position. In some embodiments, the shape and/or dimensions of the protrusion 188 correspond to the shape and/or dimensions of the recess 178. A top opening 190 is defined through the top jaw 164 is aligned with the bottom opening 180 in the closed clamping position. In some embodiments, the top opening 190 is concentric with the protrusion 188. In other embodiments, the top opening 190 passes through a different portion of the top jaw 164. As shown in FIG. 7, the top opening 190 is tapered such that the opening is wider near a top exterior surface 192 of the top jaw 164 and narrower near the top clamping surface 186. A top slot 194 defined in the top jaw 164 extends away from the top opening 190 and is aligned with the bottom slot 184. In some embodiments, the top slot 194 extends forward (i.e., along the longitudinal centerline of the top jaw 164). In other embodiments, the top slot 194 may extend in another direction away from the top opening 190. In other embodiments, the protrusion 188 is located on the bottom jaw 162 and the recess 178 is located on the top jaw 164.

Figure 11:
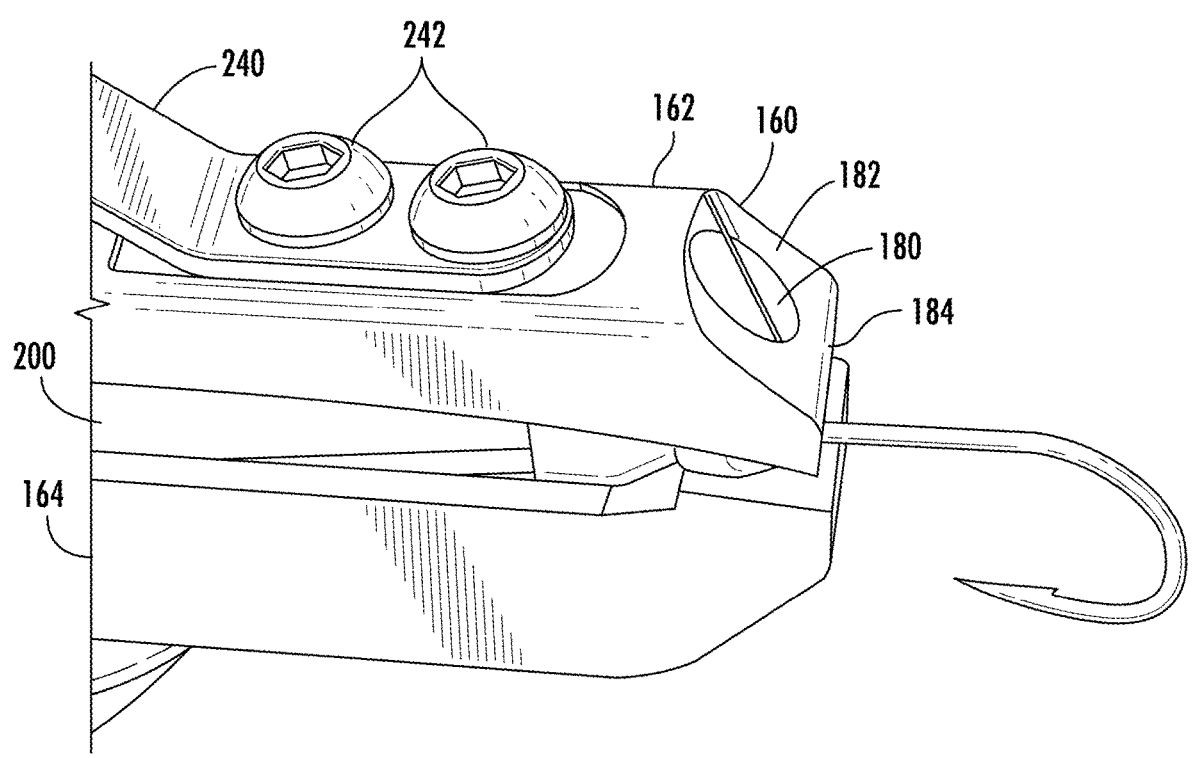
FIG. 11 is a perspective view of the cutting assembly of FIG. 8.

Fishing line is threaded through an eyelet of a fishing hook in order to tie certain knots commonly used when fishing. Conventionally, fishing line is threaded through an eyelet by hand. This task can prove difficult given the small size of the eyelet and the fishing line and the fact that some fishing line is transparent. FIG. 11 shows the tool 100 being used to thread fishing line through an eyelet of a fishing hook. An eyelet of the hook is clamped between the centering protrusion 188 and the centering recess 178 to hold the eyelet in place while threading the fishing line. The tapered end of the protrusion 188 centers the interior surface of the eyelet along the top opening 190. The stepped or tapered surface of the recess 178 centers the exterior surface of the eyelet along the bottom opening 180. Fishing line can be fed into either the bottom opening 180 or the top opening 190 and threaded through the eyelet. The relatively large widths of the bottom opening 180 and the top opening 190 near the bottom and top exterior surfaces 182, 192 allow the user to easily guide the fishing line into the bottom opening 180 or the top opening 190. The tapered surfaces of the bottom opening 180 and the top opening 190 guide the fishing line to the eyelet. This allows the user to thread the line through the eyelet more easily than by hand due to the ease of alignment provided by the bottom and top openings 180, 190. Once the line is threaded through the eyelet, the fishing line threaded through the eyelet can be removed from the tool 100 through the aligned bottom slot 184 and the top slot 194.

Figure 12:
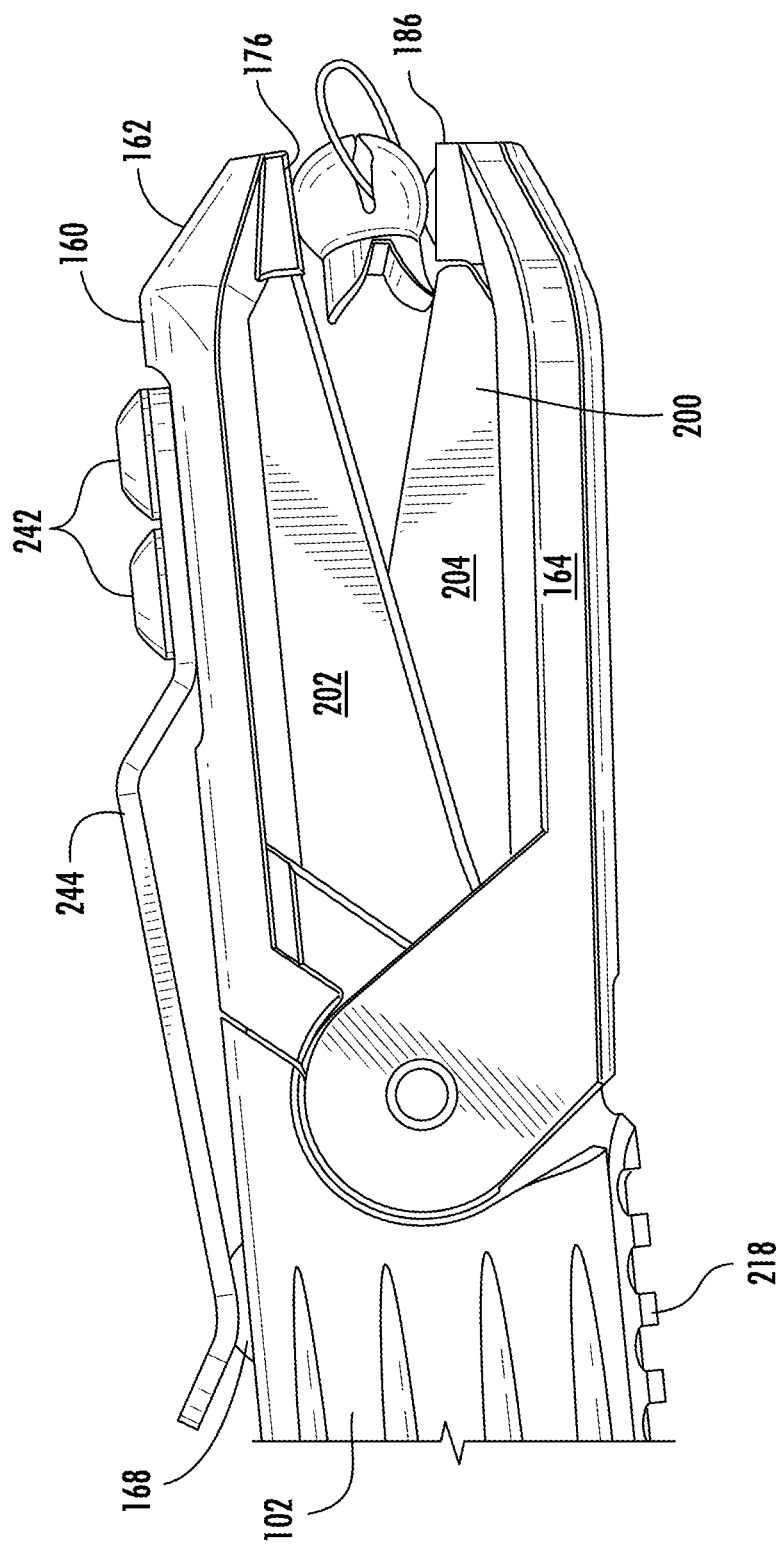
FIG. 12 is a side view of the cutting assembly of FIG. 8.

An additional use of the clamping assembly 160, shown in FIG. 12, is to crimp split shot weights onto fishing line. Split shot weights include a slot that allows the user to slid the split shot weight onto fishing line from the side, then apply a compressive force to deform (i.e., crimp) the split shot weight and attach it to the line. A user can clamp a weight between the bottom clamping surface 176 and the top clamping surface 186 in order to apply the necessary compressive force to crimp the weight.

In some embodiments, the assembly 160 further includes a scissor assembly 200. The scissor assembly 200 includes a bottom blade 202, a top blade 204, and an axle 206 about which the bottom blade 202 and the top blade 204 rotate relative to one another. The interior edges of the bottom blade 202 and the top blade 204 are sharpened to facilitate cutting (e.g., cutting fishing line). In some embodiments, the interior edges of the bottom blade 202 and the top blade 204 are serrated. By way of example, this may facilitate cutting certain materials. In some embodiments, the scissor assembly 200 further includes a number of spacers 208 positioned on the axle 206. In some embodiments, the axle 206 is a rivet that is deformed to contain the bottom blade 202, the top blade 204, and the spacers 208. In some embodiments, the scissor assembly 200 is omitted.

As shown in FIGS. 7 and 8, the scissor assembly 200 (i.e., a pair of scissors) fits inside (i.e., is contained by) the bottom jaw 162 and the top jaw 164. The top blade 204 is coupled to the top jaw 164, and the bottom blade 202 is coupled to the bottom jaw 162. The top blade 204 and the bottom blade 202 each include protrusions 210 that are received by recesses 212 in the top jaw 164 and the bottom jaw 162 respectively. The protrusions 210 prevent the scissor assembly 200 from moving relative to the top jaw 164 and the bottom jaw 162. The top blade 204 has, relative to the bottom blade 202, an open scissor position, shown in FIG. 1, a closed scissor position, and a partially closed scissor position that is located between the open and closed scissor positions. The open, closed, and partially closed relative positions of the top blade 204 and the bottom blade 202 may be referred to as open, closed, and partially closed scissor positions of the scissor assembly 200. Because the top blade 204 and the bottom blade 202 are coupled to the top jaw 164 and the bottom jaw 162, the open and closed scissor positions of the scissor assembly 200 correspond with the open and closed positions of the top jaw 164 and the bottom jaw 162. Referring to FIG. 13, in some embodiments the scissor assembly 200 includes a biasing member 214 (e.g., a torsion spring, a compression spring, etc.) to apply a biasing force to bias the scissor assembly 200 toward the open scissor position. The top blade 204 and the bottom blade 202 each include notches 216 that receive a portion of the biasing member 214 and prevent the biasing member 214 from rotating relative to the top blade 204 and the bottom blade 202.

In some embodiments, the assembly 160 includes a lock 218 slidably coupled to the main body 102. In other embodiments, the lock 218 is otherwise coupled to various components of the tool 100 (e.g., rotatably coupled to the bottom jaw 162). The lock 218 is movable between a locked position, shown in FIGS. 6 and 7, and an unlocked position, shown in FIG. 1. In the unlocked position, the lock 218 allows the top jaw 164 to move freely relative to the bottom jaw 162. In the locked position, the lock 218 prevents the top jaw 164 from moving relative to the bottom jaw 162. In some embodiments, the lock 218 holds the top jaw 164 in the partially closed clamping position. In other embodiments, the lock 218 holds the top jaw 164 in other positions (e.g., the closed clamping position, a user selected position, etc.). In the partially closed clamping position, a gap 220 is defined between the bottom clamping surface 176 and the top clamping surface 186. In some embodiments, the gap 220 is smaller than the thickness of a human finger, but larger than the thickness of fishing line (e.g., 2 mm, 3 mm, etc.). This allows fishing line to pass through the gap 220 and be cut on the scissor assembly 200, but prevents a user from accidentally touching the sharpened edges of the scissor assembly 200. A user can then use the tool 100 to cut fishing line without having to move the lock 218. If a user wishes to move the scissor assembly 200 while cutting (e.g., to cut a piece of fishing line, to cut open a package, etc.), they can move the lock 218 to the unlocked position.

In some instances, a user may wish to remove the scissor assembly 200 from the tool 100. By way of example, the user may wish to sharpen the blades 202, 204 after an extended period of use. By way of another example, the user may wish to replace the blades 202, 204 if they become broken. By way of yet another example, the user may wish to clean the blades 202, 204. Conventional fishing tools that include scissors incorporate the blades of the scissors into the tools such that they are difficult or impossible to remove. If a user wishes to remove the scissor assembly 200 from the tool 100, they can remove the fasteners 170. The fasteners 170 prevent the top jaw 164 and the bottom jaw 162 from moving apart, thus containing the scissor assembly 200 between the top jaw 164 and the bottom jaw 162. If the user removes the fasteners 170 (e.g., by unscrewing them), the top jaw 164 and the bottom jaw 162 can be separated, and the protrusions 210 can be removed from the recesses 212, releasing the scissor assembly 200. To reassemble the tool 100, the same scissor assembly 200 or a replacement scissor assembly 200 can be placed between the top jaw 164 and the bottom jaw 162, and the fasteners 170 can be replaced.

In some embodiments, the tool 100 includes a lanyard mount 230. As shown in FIG. 1, the lanyard mount 230 is located between the main body 102 and the clamping assembly 110. The lanyard mount 230 further defines a lanyard aperture 232 though which a lanyard may be tied. In some embodiments, the lanyard mount 230 extends around the clamping assembly 110 such that it can rotate freely relative to the main body 102 and the clamping assembly 110. The lanyard mount 230 may perform a similar function to a thrust washer and support a portion of the axial loading on the clamping assembly 110. In other embodiments, the lanyard aperture 232 is defined elsewhere on the tool 100, or the lanyard aperture 232 is omitted.

In some embodiments, the tool 100 includes a clip 240 coupled to the tool 100. As shown in FIGS. 6 and 7, the clip 240 is coupled to the bottom jaw 162 using fasteners 242. The fasteners 242 are threaded into apertures 244. The clip 240 can be used to clip the tool 100 onto a thin piece of material such as a belt, strap, or a wall of a tackle box. In some embodiments, the clip 240 is included elsewhere on the tool 100 (e.g., the main body 102), or the clip 240 is omitted.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A fishing tool comprising:
a main body extending along a longitudinal axis; and
a holding assembly coupled to the main body, comprising:
a bottom holding jaw; and
a top holding jaw rotatably coupled to the bottom holding jaw via a pin and movable relative to the bottom holding jaw between an open holding position and a closed holding position to selectively hold a fish hook in place,
wherein the holding assembly is rotatable with respect to the main body about the longitudinal axis of the main body between a first position and a second position and configured to be secured relative to the main body in a fixed number of positions, including the first position and the second position.

2. The fishing tool of claim 1, further comprising a biasing member configured to bias the top holding jaw toward the closed holding position.

3. The fishing tool of claim 1, further comprising a lanyard mount disposed between the holding assembly and the main body, wherein the lanyard mount defines a lanyard aperture through which a lanyard may be tied.

4. The fishing tool of claim 1, the main body including a locking member configured to prevent rotation when the holding assembly is oriented in one of the fixed number of positions.

5. The fishing tool of claim 4, wherein the locking member is movable relative to the main body and biased toward the holding assembly by a biasing force.

6. The fishing tool of claim 5, the holding assembly defining a plurality of detents configured to receive the locking member to prevent rotation of the holding assembly, wherein a quantity of detents of the holding assembly is greater than a quantity of locking members of the main body.

7. The fishing tool of claim 1, wherein one of the top holding jaw and the bottom holding jaw includes a protrusion, and wherein the other of the top holding jaw and the bottom holding jaw defines an aperture configured to receive the protrusion when the top holding jaw is in the closed holding position.

8. The fishing tool of claim 7, wherein a protrusion width is greater near a base end of the protrusion and lesser near a distal end of the protrusion.

9. The fishing tool of claim 1, further comprising a cutting assembly coupled to the main body, the cutting assembly comprising:
a top cutting jaw;
a bottom cutting jaw rotatable relative to the top jaw; and
a scissor assembly, comprising:
a top blade; and
a bottom blade rotatable relative to the top blade;

wherein the top blade and the bottom blade are removably coupled to the top cutting jaw and the bottom cutting jaw.

10. The fishing tool of claim 9, wherein the bottom cutting jaw includes a bottom opening formed through the bottom cutting jaw and a bottom slot extending away from the bottom opening;

wherein the top cutting jaw includes a top opening formed through the top cutting jaw and a top slot extending away from the top opening, wherein the top cutting jaw is movable relative to the bottom cutting jaw between an open clamping position and a closed clamping position configured to hold a fish hook in place between the top cutting jaw and the bottom cutting jaw, wherein, in the closed clamping position, the top opening is aligned with the bottom opening to allow a fishing line to be threaded through an eyelet of the fish hook held between the top clamping surface and the bottom clamping surface; and wherein the top slot is aligned with the bottom slot so that the fishing line threaded through the eyelet of the fish hook is removable through the top slot and the bottom slot.

11. The fishing tool of claim 10, wherein the top cutting jaw includes a centering protrusion and the bottom cutting jaw defines a centering recess that receives the centering protrusion when the top cutting jaw is in the closed clamping position.

12. The fishing tool of claim 10, wherein the top cutting jaw includes a top exterior surface, wherein the bottom cutting jaw includes a bottom exterior surface, wherein the top opening is wider near the top exterior surface and narrower near the top clamping surface, and wherein the bottom opening is wider near the bottom exterior surface and narrower near the bottom clamping surface.

13. The fishing tool of claim 10, further comprising a biasing member configured to apply a biasing force to bias the top cutting jaw toward the open clamping position.

14. The fishing tool of claim 1, further comprising:
a clamping assembly coupled to the main body, comprising:
a bottom clamping jaw including a bottom opening formed through the bottom clamping jaw and a bottom slot extending away from the bottom opening; and
a top clamping jaw including a top opening formed through the top clamping jaw and a top slot extending away from the top opening, wherein the top clamping jaw is rotatably coupled to the bottom clamping jaw and is movable relative to the bottom clamping jaw between an open clamping position and a closed clamping position configured to hold a fish hook in place between the top clamping jaw and the bottom clamping jaw, wherein, in the closed clamping position, the top opening is aligned with the bottom opening to allow a fishing line to be threaded through an eyelet of the fish hook held between the top clamping surface and the bottom clamping surface; and wherein the top slot is aligned with the bottom slot so that the fishing line threaded through the eyelet of the fish hook is removable through the top slot and the bottom slot.

15. The fishing tool of claim 14, wherein the top clamping jaw includes a centering protrusion and the bottom clamping jaw defines a centering recess that receives the centering protrusion when the top clamping jaw is in the closed clamping position.

16. The fishing tool of claim 14, wherein the top clamping jaw includes a top exterior surface, wherein the bottom clamping jaw includes a bottom exterior surface, wherein the top opening is wider near the top exterior surface and narrower near the top clamping surface, and wherein the bottom opening is wider near the bottom exterior surface and narrower near the bottom clamping surface.

17. The fishing tool of claim 14, further comprising a biasing member configured to apply a biasing force to bias the top clamping jaw toward the open clamping position.

* * * * *